United States Patent
Lex et al.

(10) Patent No.: US 6,717,678 B2
(45) Date of Patent: Apr. 6, 2004

(54) MONOLITHIC CORRECTOR PLATE

(75) Inventors: Robert M. Lex, Guilford, CT (US); Andrew Eric Carlson, Middletown, CT (US); Michael Metz, Yorktown Heights, NJ (US)

(73) Assignee: Zygo Corporation, Middlefield, CT (US)

( * ) Notice: Subject to any disclaimer, the term of this patent is extended or adjusted under 35 U.S.C. 154(b) by 0 days.

(21) Appl. No.: 10/013,852

(22) Filed: Dec. 10, 2001

(65) Prior Publication Data

US 2002/0145738 A1 Oct. 10, 2002

Related U.S. Application Data

(60) Provisional application No. 60/254,235, filed on Dec. 8, 2000.

(51) Int. Cl.[7] .................................................. G01B 9/02
(52) U.S. Cl. ...................................................... 356/498
(58) Field of Search .................................. 356/486, 487, 356/492, 493, 498, 500

(56) References Cited

U.S. PATENT DOCUMENTS

| | | | |
|---|---|---|---|
| 4,752,133 A | 6/1988 | Sommargren | 356/349 |
| 4,784,490 A | 11/1988 | Wayne | |
| 4,802,764 A | 2/1989 | Young et al. | 356/349 |
| 4,802,765 A | 2/1989 | Young et al. | 356/349 |
| 4,859,066 A | 8/1989 | Sommargren | 356/349 |
| 4,881,815 A | 11/1989 | Sommargren | 356/349 |
| 4,881,816 A | 11/1989 | Zanoni | 356/349 |
| 4,883,357 A | 11/1989 | Zanoni et al. | 356/349 |
| 4,890,921 A | * 1/1990 | Pond et al. | 356/485 |
| 4,950,078 A | * 8/1990 | Sommargren | 356/487 |
| 5,446,546 A | * 8/1995 | Breidenbach et al. | 356/35.5 |
| 5,449,313 A | 9/1995 | Kordonsky et al. | 451/35 |
| 5,525,249 A | 6/1996 | Kordonsky et al. | 252/62.56 |
| 5,577,948 A | 11/1996 | Kordonsky et al. | 451/35 |
| 5,616,066 A | 4/1997 | Jacobs et al. | 451/36 |
| 5,795,212 A | 8/1998 | Jacobs et al. | 451/36 |
| 5,801,832 A | 9/1998 | Van Den Brink | |
| 5,886,786 A | * 3/1999 | Kanaya et al. | 356/498 |
| 5,951,369 A | 9/1999 | Kordonski et al. | 451/5 |
| 5,971,835 A | 10/1999 | Kordonski et al. | 451/38 |
| 6,084,673 A | 7/2000 | Van Den Brink et al. | 356/358 |

OTHER PUBLICATIONS

Column Reference Plane Mirror Interferometer with Steering Wedges, Zygo Part No. 6191–0539–01.
Pitch, Yaw, and Linear Displacement Interferometer (Y–axis), Zygo Part No. 6191–0591–01 and 02.

* cited by examiner

*Primary Examiner*—Samuel A. Turner
(74) *Attorney, Agent, or Firm*—Fish & Richardson P.C.

(57) ABSTRACT

A monolithic corrector plate for an interferometer, includes a substrate having an input face for intercepting a first beam emitted by the interferometer, and an output face opposite the input face. An aperture integral with the substrate is configured to transform a first beam intercepted by the input face into a second beam emerging from the output face.

14 Claims, 10 Drawing Sheets

MONOLITHIC CORRECTOR PLATE

RELATED APPLICATIONS

This application claims the benefit of the priority date of U.S. provisional application No. 60/254,235 filed on Dec. 8, 2000, the contents of which are herein incorporated by reference.

FIELD OF THE INVENTION

This invention relates to distance-measuring equipment, and in particular, to interferometers.

BACKGROUND

A multi-axis interferometer generates several beams to be used in connection with distance measurement. To enhance the accuracy of distance measurements, these beams should all be perfectly parallel. One approach to ensuring parallel beams is to impose strict tolerances during the manufacture of the interferometer.

In practice, it is difficult to construct a multi-axis interferometer that generates perfectly parallel beams. As a result, it is often necessary to make minor adjustments to the beams that emerge from the interferometer. The extent and type of minor adjustments to be made varies between interferometers and also between different beams formed by the same interferometer.

One approach to correcting the beams that emerge from an interferometer is to incorporate an adjustable optical element, such a Risley prism, in the path of each beam emerging from the interferometer. The adjustable optical elements can then be individually adjusted to accommodate the imperfections in the particular beam with which it is associated. In particular, each individual prism is adjusted to alter the direction of propagation for its associated beam.

SUMMARY

The invention is a corrector plate for any multi-beam interferometer or even more generally, a corrector plate for any multi-beam optical device for which beam pointing correction might be appropriate. For example, this invention uses an optical plate with a series of polished sub-apertures to correct the beam pointing of a multi-axis interferometer. The sub-apertures can be of any perimeter size, and have either a regular (circular or rectangular) or an irregular shape. An alternative embodiment will use a plate with a continuously varying curved surface rather than discreet sub-apertures. Furthermore, the beam pointing sub-apertures can be part of a separate plate that is added to the optical system (e.g., interferometer) or they can be formed in another optical component that is part of the optical system itself (i.e., not an add-on component).

In another aspect, the invention is a method of correcting for beam pointing errors by first measuring those errors and then forming multiple correcting sub-apertures in the plate and/or component.

We have identified the Magneto Rheological Finishing (MRF) process and machine as one appropriate way of making the sub-apertures described herein. A commercial machine that is available for fabricating the sub-apertures in accordance with that method is made by and available through OED Technologies of 1040 University Avenue, Rochester, N.Y. 14607. The method is described in the following patents: U.S. Pat. Nos. 5,971,835; 5,951,369; 5,525,249; 5,616,066; 5,795,212; 5,577,948; and 5,449,313; the contents of which are incorporated herein by reference.

It should be understood, however, that though we have identified the MRF process as a way of fabricating the sub-apertures, any other known methods for forming such sub-apertures by polishing or by any other known techniques could be used.

The invention provides a corrector plate that intercepts each of the beams that emerge from a multi-axis interferometer. Each beam illuminates a different aperture portion of the corrector plate. The aperture portion intercepted by a particular beam is configured to correct the characteristics of that particular beam.

In one embodiment, a monolithic corrector plate includes a substrate having an input face for intercepting a first beam emitted by the interferometer, and an output face opposite the input face. An aperture integral with the substrate is configured to transform a first beam intercepted by the input face into a second beam emerging from the output face.

In one aspect of the invention, the aperture is configured to form a second beam having a selected direction of propagation. The selected direction of propagation is different from a direction of propagation of the first beam. Preferably, the aperture is configured to form a second beam propagating in a direction orthogonal to the output face. One optical device for correcting the direction of propagation of the first beam is a prism.

In another aspect, the aperture is configured to form a second beam having a different phase front from the first beam. This can be achieved by providing an aperture that includes a lens. Preferably, the aperture is configured to form a second beam having a planar phase front, particularly one having a planar phase front parallel to the output face.

In another embodiment, the aperture merges continuously with neighboring apertures thereof. In this embodiment, the boundaries between apertures become less distinct.

In another embodiment, the invention provides an interferometer having an interferometer housing from which emerges a first beam. The interferometer further includes a substrate having an input face for intercepting the first beam from the interferometer, and an output face opposite the input face. An aperture integrated into the substrate is configured to transform the first beam incident on the input face into a second beam emerging from the output face.

In another embodiment, a multi-axis interferometer includes an optically transmissive monolith. The monolith has a multiplexer portion and a beam splitter portion. The multiplexer portion is configured to split an input beam into a corresponding plurality of intermediate beams, each of the intermediate beams being directed toward the beam splitter portion through a corresponding output port of the multiplexer portion. The beam splitter portion is configured to separate the intermediate beam into a measurement component and a reference component. An optically transmissive substrate is disposed to receive a first beam from the beam splitter portion. The first beam can include the measurement component or the reference component. The substrate includes an input face for intercepting the first beam, and an output face coupled to the input face. An aperture integrated into the substrate, is configured to transform the first beam incident into a second beam emerging from the output face.

These and other features of the invention will be apparent from the following detailed description and its accompanying figures, in which:

DETAILED DESCRIPTION

Figure 1:
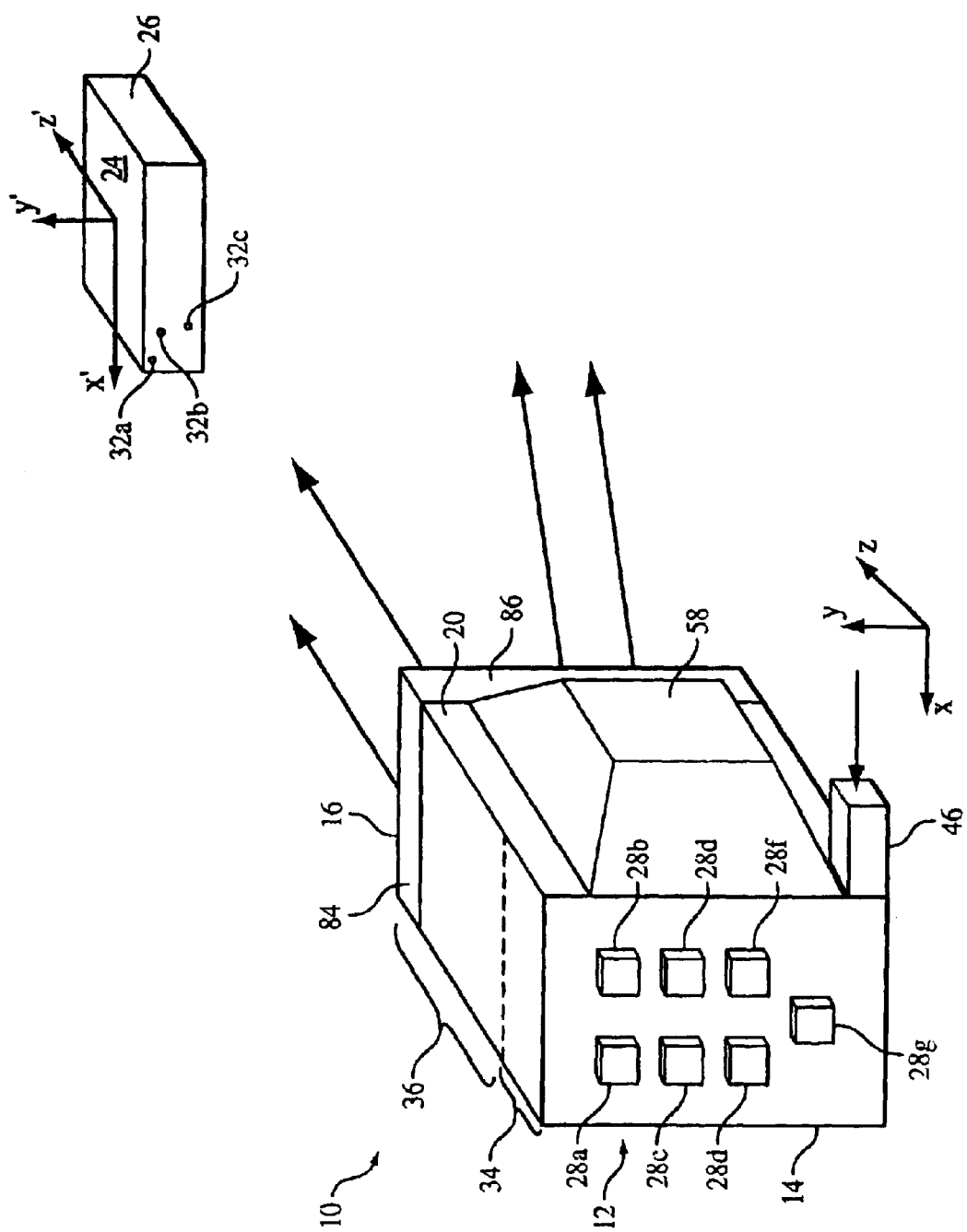
FIG. 1 is an isometric view of a multi-axis interferometer.

A multi-axis interferometer 10 according to the invention, as shown in FIG. 1, includes an optically transparent monolith 12 having a rear face 14, a measurement face 16 opposite the rear face 14, a reference face 18 perpendicular to and connecting the edges of the measurement face 16 and the rear face 14, and an input/output ("I/O") face 20 opposite the reference face 18. With reference to the coordinate system shown in FIG. 1, the measurement and rear faces 16, 14 are parallel to the xy plane; the reference face 18 and the I/O face 20 are parallel to the yz plane.

The multi-axis interferometer 10 is shown illuminating an edge 22 of a target 24 with an array of measurement beams to detect translation and rotation of the target 24. With reference to the local x'y'z-coordinate system associated with the target 24, the target 24 is said to experience "pitch" when it rotates about the x' axis, "yaw" when it rotates about the y' axis, and "roll" when it rotates about the z' axis. In the configuration shown, the interferometer 10 cannot detect roll because the distance between the interferometer 10 and the illuminated edge 22 does not change as the target 24 rolls. For similar reasons, the interferometer 10 configured as shown does not detect translation along either the y' or the x' axis. These motions can be detected by placing a second interferometer to illuminate a perpendicular edge 26 of the target 24.

Figure 2:
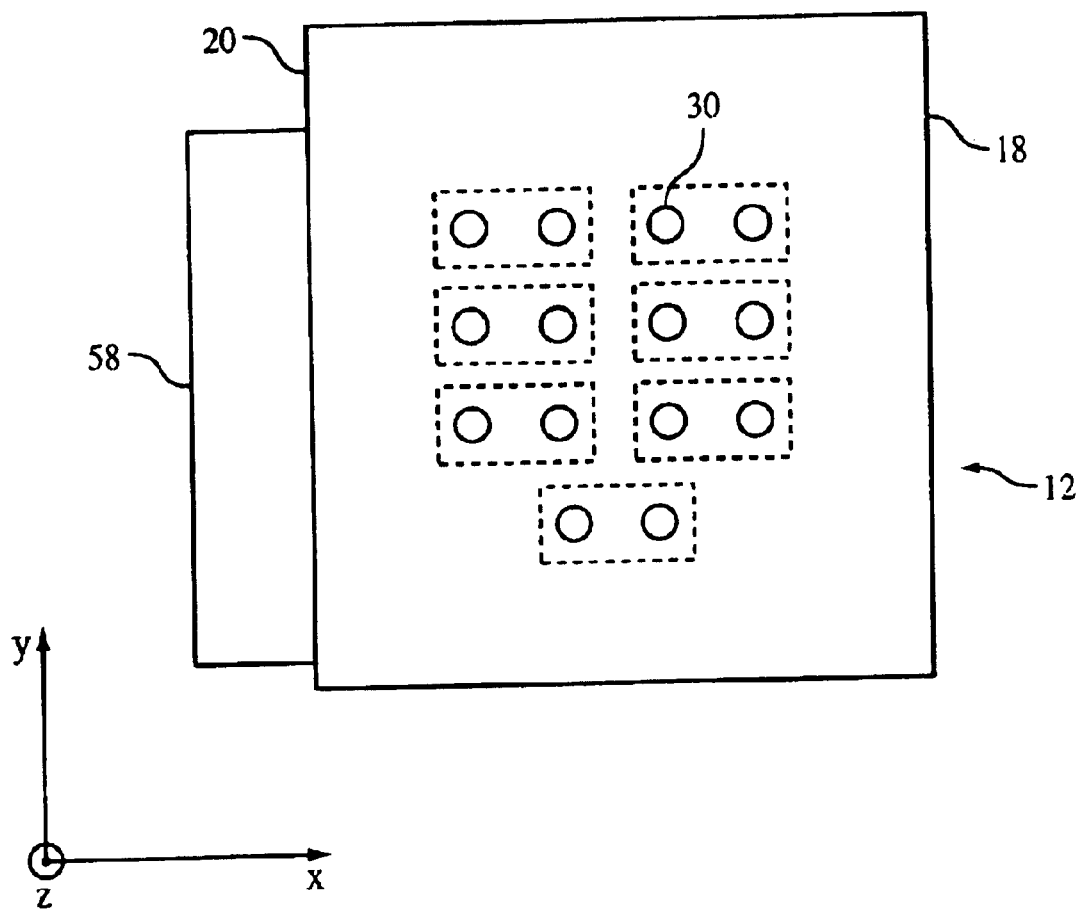
FIG. 2 is a plan view of the measurement face of the interferometer of FIG. 1.

An array of retro-reflectors 28a–g (designated generally as 28) is disposed on the rear face 14 of the monolith 12. In the illustrated embodiment, there are four rows of retro-reflectors, three of which have two columns and one of which has only one column. Each retro-reflector 28 is a corner of a cube having a reflective inner surface. In operation, the array of retro-reflectors 28a–g forms a corresponding array of measurement beams on the measurement face 16, as shown in FIG. 2. Each retro-reflector 28 (shown in dashed lines in FIG. 2) is associated with one beam 30 emerging from the portion of the measurement face 16 directly opposite the retro-reflector 28. Although there appear to be twice as many beams 30 as there are retro-reflectors 28, this is only an illusion. As will be seen below, the folded path traversed by each beam 30 within the monolith 12 is such that the beam 30 makes two round trips between the monolith 12 and the target 24.

The configuration of retro-reflectors 28 depends on the constraints of the application. Referring back to FIG. 1, each measurement spot 32a–c on the target 24 is associated with one retro-reflector 28a–c. Thus, three retro-reflectors 28a–c are sufficient to illuminate the three measurement spots 32a–c that are required to obtain translation, pitch, and yaw of a first target 24. The illustrated embodiment includes three additional retro-reflectors 28d–f for providing beams used to measure translation, pitch, and yaw of a second target (not shown). These additional retro-reflectors 28d–f enable a single interferometer 10 to detect relative motion between the first and second targets. The remaining retro-reflector 28g and its associated beam is used for measuring surface roughness of the illuminated edge 22. This information is used to correct the measurement made by the measurement beams associated with the remaining retro-reflectors 28a–f.

The monolith 12 itself is divided into a multiplexing layer 34 and a beam-splitting layer 36. As indicated by the dashed line in FIG. 1, these two layers are not joined or affixed to each other. The multiplexing layer 34 and the beam-splitting layer 36 are part of the same monolithic structure in much the same way that the individual transistors of an integrated circuit are part of, or integral with, the same silicon crystal. The multiplexing layer 34 extends from the rear face 14 to the beginning of the beam-splitting layer 36 in the interior of the monolith 12. This multiplexing layer 34 has opposed first and second mirrored interior faces 36, 38, best seen in FIG. 3, that are perpendicular to the rear face 14 of the monolith 12.

Figure 3:
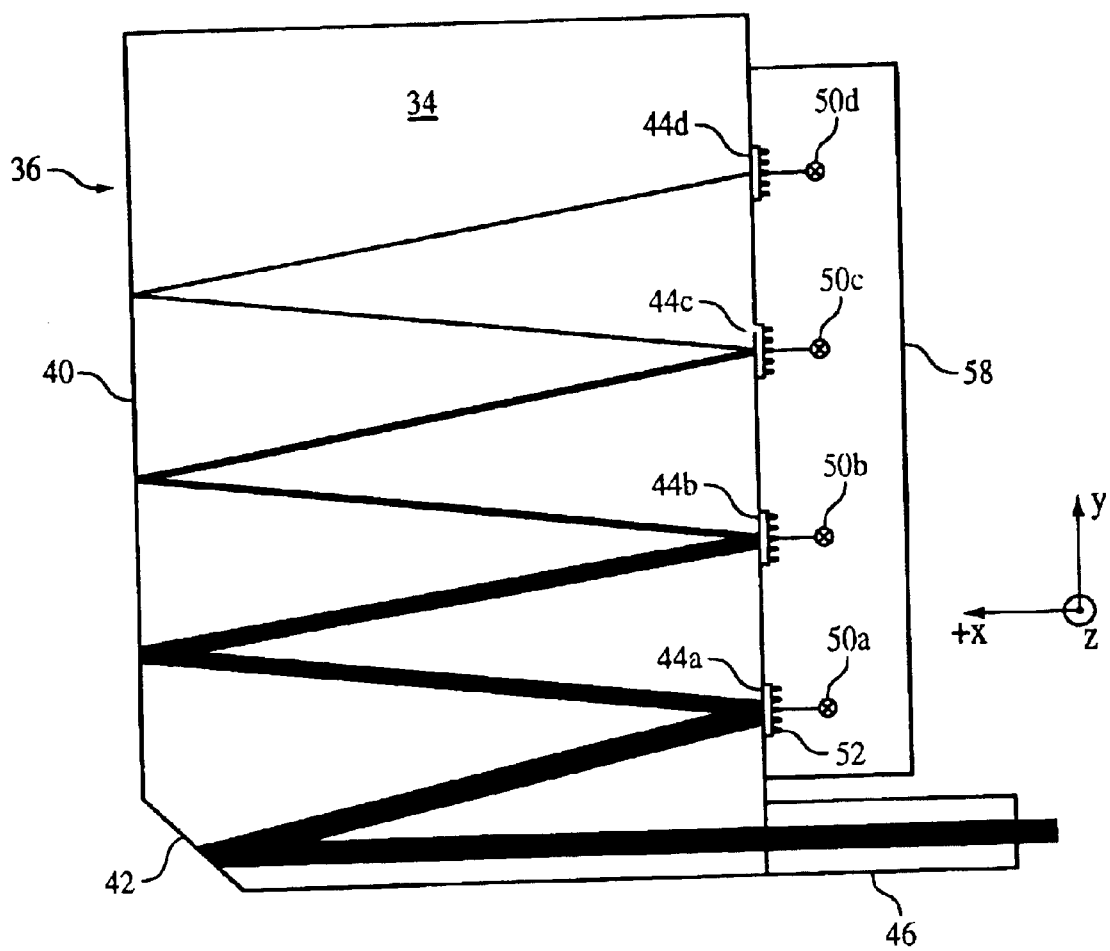
FIG. 3 is a cross-section of the beam multiplexing layer of the interferometer shown in FIG. 1.

FIG. 3 shows a cross-section obtained by slicing the multiplexing layer 34 along the xy plane. The first interior face 36 has a first facet 40 that is coplanar with the reference face and a second facet 42 that makes an obtuse angle with the first facet 40. The second interior face 38 is punctuated by a plurality of output couplers 44a–d (designated generally as 44) arranged along a line extending parallel to the rows in the array of retro-reflectors 28. The number of output couplers 44 on the second interior face 38 corresponds to the number of such rows.

Referring back to FIG. 1, a feed structure 46, also integral to the monolith 12, protrudes from a bottom edge of the I/O face 20. The feed structure 46 redirects an input laser beam into the multiplexing layer 34, where it is split into a plurality of intermediate beams 50a–d (shown in FIG. 3). Each of the intermediate beams has essentially the same power as all the other intermediate beams.

As shown in FIG. 3, the feed structure 46 directs an input beam 48 toward the second facet 42. The second facet 42 reflects the input beam 48 toward a first output coupler 44a along a path that makes a grazing angle relative to a line normal to the second interior face 38. The transmissivity of the first output coupler 44a is selected such that a first quarter of the power in the input beam 48 is transmitted through the first output coupler 44a to form a first intermediate beam 50a. The input beam 48, with its power density diminished by one-quarter, is reflected back toward the first facet 40. Because the input beam 48 is incident on the first facet 40 at a grazing angle, it is reflected by the first facet 40 toward a second output coupler 44b. The transmissivity of the second output coupler 44b is selected such that one third of the power incident thereon is transmitted to form a second intermediate beam 50b. Since the residual power incident on the second output coupler 44b is three-quarters of the original power in the input beam 48, this one third of three-quarters amounts to one-quarter, which is the same amount of power that was transmitted through the first output coupler 44a. As a result, the second intermediate beam 50b has the same power density as the first intermediate beam 50a. This pattern continues with the third output coupler 44c, which transmits one half of the residual power incident thereon (which amounts to one-quarter of the original power available in the input beam 48), and the fourth and final output coupler 44d, which transmits all the residual power incident thereon. This results in the generation of four intermediate beams 50a–d that ultimately enter the beam-splitting layer 36. While the illustrated example applies to the case of four output couplers 44a–d, the principle shown is applicable to other numbers of output couplers 44.

As shown in FIG. 3, when the input beam 48 is incident on an output coupler 44, it is incident at a grazing angle relative to the second interior face 38. This is useful because it allows the reflected portion of the input beam 48 to be reflected back and forth across the multiplexing layer 34 along a zigzag path. It is undesirable, however, for the transmitted portion of the input beam 48 to proceed along this grazing angle as it passes through the output coupler 44.

The output coupler 44 includes a refractive component for bending the transmitted portion of a beam incident at a grazing angle into an intermediate beam 50 that is normal to the second interior face 38. In the illustrated embodiment, this is achieved by providing a suitable diffractive element, such as a diffraction grating 52, as part of the output coupler 44. Other refractive components can be used however. For example, the refractive component can be a volume of monolith 12 having an appropriate geometry and containing a material having an appropriately selected index of refraction.

Figure 4:
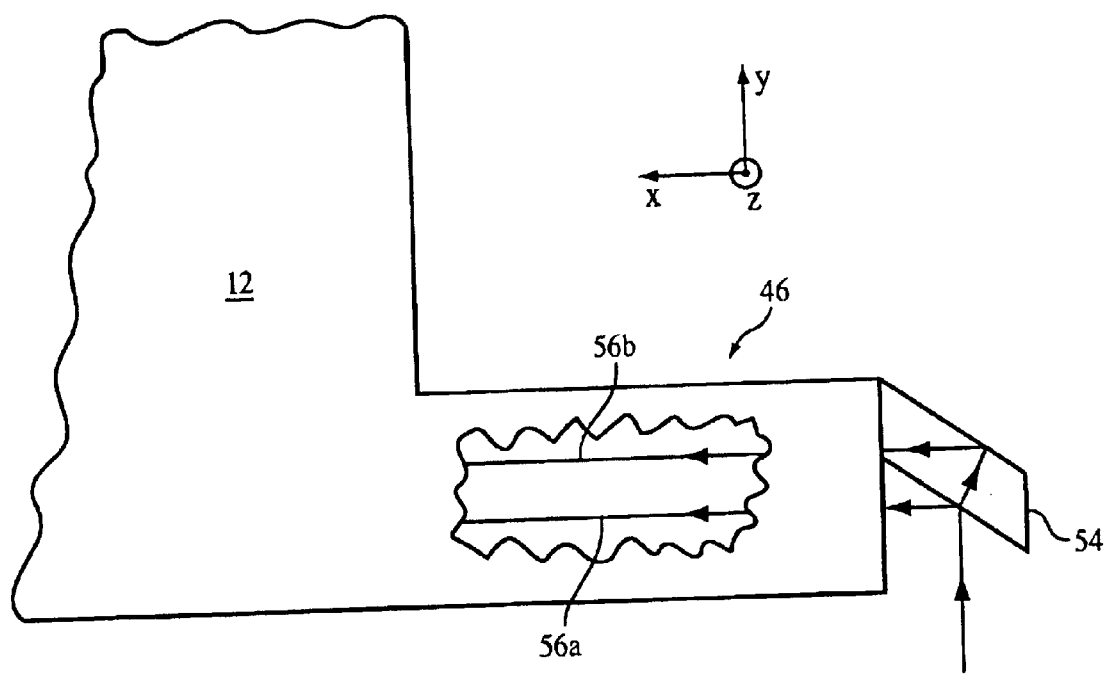
FIG. 4 is a cross-section of the feed structure of the interferometer shown in FIG. 1.

In one embodiment, shown in FIG. 4, the feed structure 46 includes a non-polarizing beam splitter 54 that splits the input beam 48 into a first feed beam 56a and a second feed beam 56b. This second feed beam 56b is not shown in FIG. 3 because it is out of the plane of the figure. The first feed beam 56a will be split into the intermediate beams 50 that illuminate a first column of retro-reflectors. The second feed beam 56b will be split into the intermediate beams 50 that illuminate a second column of retro-reflectors. The separation between the two columns of retro-reflectors in FIG. 1 (and hence between the second and third columns of beams in FIG. 2) corresponds to the separation between the first and second feed beams 56a, 56b in FIG. 4. When a feed structure 46 such as that shown in FIG. 4 is in use, the operation of the multiplexing layer 34 is identical to that described above, with the exception that the multiplexing layer 34 operates on the feed beams rather than directly on the input beam 48.

Figure 5:
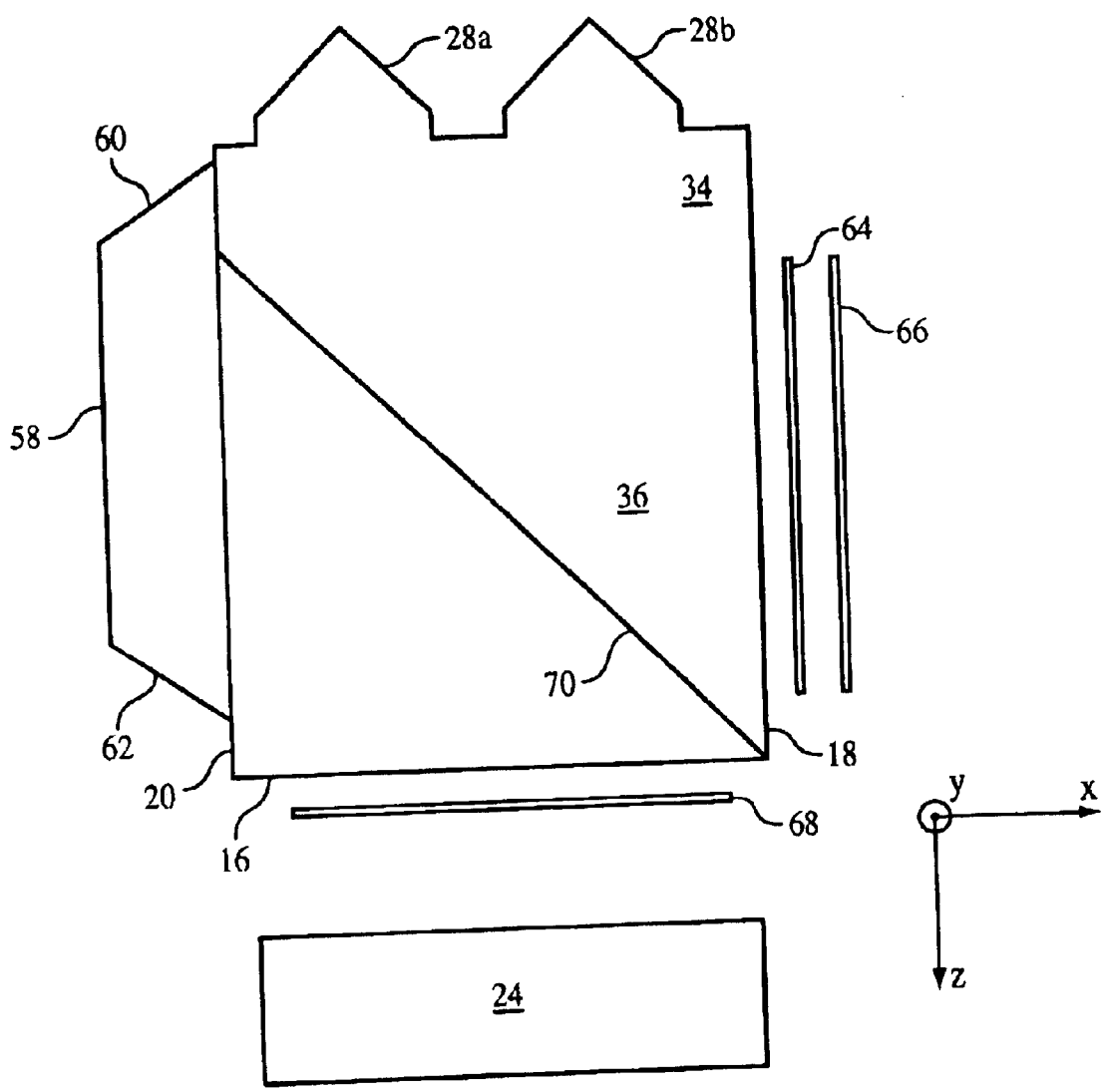
FIG. 5 is a cross-section of the interferometer showing the beam-splitting plane.

The beam-splitting layer 36, shown in the cross section of FIG. 5, is bounded by the I/O face 20, the reference face 18, the measurement face 16, and by the multiplexing layer 34. A corner reflector 58 is mounted on the I/O face 20 and oriented to direct intermediate beams 50 emerging from the output couplers 44 into the beam-splitting layer 36. FIG. 5 shows intermediate beams 50 exiting the output coupler 44 in the -x direction and being reflected in the z direction by a rear facet 60 of the corner reflector 58. A front facet 62 opposite the rear facet intercepts intermediate beams 50 traveling in the z direction and reflects them in the +x direction, into the beam-splitting layer 36 of the monolith 12.

The interferometer 10 also includes two quarter-wave retarders. A quarter-wave retarder is an optical element that alters the polarization of light passing through it. When linearly polarized light having a first polarization vector passes through a quarter-wave retarder, it is transformed into circularly polarized light. If this circularly polarized light is reflected back into the quarter-wave plate, (so that it is now circularly polarized in the opposite direction) it is transformed back into linearly polarized light having a second polarization vector orthogonal to the first polarization vector.

A first quarter-wave retarder 64 is mounted between the reference face 18 and a reference mirror 66 disposed outside the monolith 12 on a plane parallel to the reference face 18. A second quarter-wave retarder 68 is mounted adjacent to the measurement face 16 such that, when a target 24 is positioned for illumination by the interferometer 10, the second quarter-wave retarder 68 lies between the measurement face 16 and the target 24.

A beam-splitting plane 70 bisects the beam-splitting layer 36 along a diagonal. The beam-splitting plane 70 is coated with a material that transmits light of one polarization but reflects light of another, orthogonal polarization. In this way, the beam-splitting plane 70 splits a beam having mixed polarization into two linearly polarized beams having orthogonal polarization vectors.

The input beam 48 of the interferometer 10 includes two components: a reference component and a measurement component. Upon entering the beam-splitting layer 36, the reference component has a first linear polarization (the "P" polarization) and the measurement component has a second linear polarization (the "S" polarization) orthogonal to the P polarization.

Figure 6:
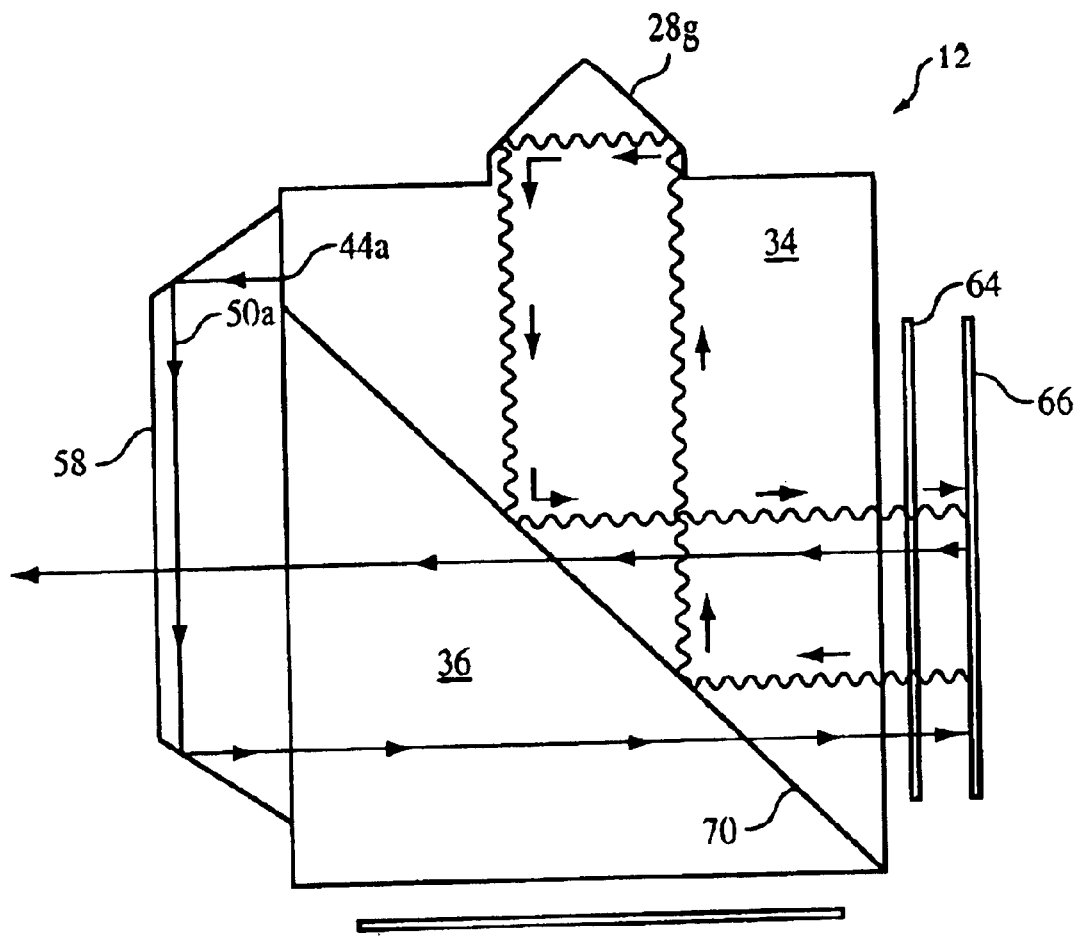
FIG. 6 shows the path followed by the reference component of the intermediate beam in a plane having one retro-reflector.
Figure 6:
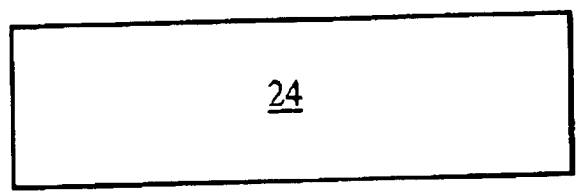
Figure 7:
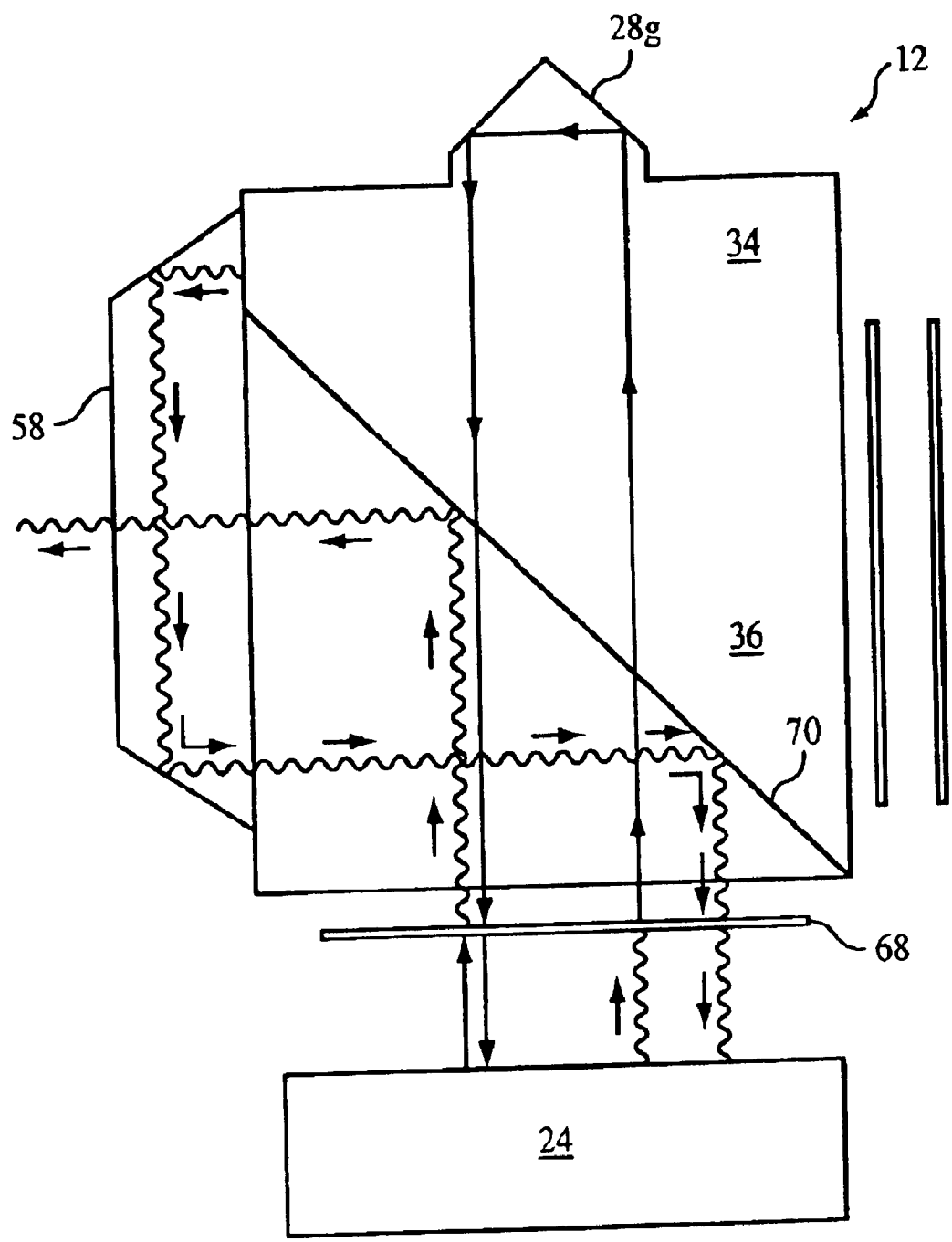
FIG. 7 shows the path followed by the measurement component of the intermediate beam in a plane having one retro-reflector.

FIGS. 6 and 7 show the paths followed by the reference beam and the measurement beam in the plane that intersects the bottom row of retro-reflectors. The measurement beam in these and subsequent figures is shown as a first wavy line; the reference component, which is orthogonally polarized relative to the measurement component, is shown by a second wavy line rotated ninety degrees relative to the first wavy line (and hence appearing to be a straight line). Although these paths are shown as being displaced from each other, this displacement is shown only to facilitate understanding the operation of the beam-splitting layer 36. In fact, the measurement and reference components of the beam travel along the same physical path.

In FIG. 6, the reference component of the input beam 48 emerges from the output coupler 44a and reflects twice off the corner reflector 58 before entering the beam-splitting layer 36 through the I/O face 20. The reference component then reaches the beam-splitting plane 70. Since the reference component is P-polarized, it passes through the beam-splitting plane 70, through the reference face 18, and through the first quarter-wave retarder 64 before reflecting off the reference mirror 66. The reference component then crosses the first quarter-wave retarder 64 once more before re-entering the beam-splitting layer 36 through the reference face 18. The first quarter-wave retarder 64 transforms the P-polarized reference component into an S-polarized reference component. As a result, when the reference component again reaches the beam-splitting plane 70, it is reflected into the retro-reflector 28g.

The retro-reflector 28g reverses the reference component's direction so that it again travels toward the beam-splitting plane 70. Since the reference component is still S-polarized, the beam-splitting plane 70 reflects it back out the reference face 18 to the first quarter-wave retarder 64 and finally to the reference mirror 66. The reference mirror 66 then reflects the reference component back toward the first quarter-wave retarder 64. The first quarter-wave retarder 64 transforms the S-polarized reference component into a P-polarized reference component. As a result, when the reference component again reaches the beam-splitting plane 70, it passes through the beam-splitting plane 70 and exits the beam-splitting layer 36 through the I/O face 20.

In FIG. 7, the measurement component of the intermediate beam emerges from the output coupler 44a and reflects twice off the corner reflector 58 before entering the beam-splitting layer 36 through the I/O face 20. The measurement component then reaches the beam-splitting plane 70. Since the measurement component is S-polarized, the beam-splitting plane 70 reflects it toward the measurement face 16. The measurement component then proceeds through the measurement face 16, through the second quarter-wave retarder 68, and on to the target 24. After being reflected from the target 24, the measurement component makes a second pass through the second quarter-wave retarder 68. On this second pass, the second quarter-wave retarder 68 changes the S-polarized measurement component into a P-polarized measurement component. As a result, when the measurement component again reaches the beam-splitting plane 70, it passes straight through and proceeds toward the retro-reflector 28g.

The retro-reflector 28g then reverses the measurement component so that it now travels back toward the measurement face 16. On its way to the measurement face 16, the measurement component again encounters the beam-splitting plane 70. Since the measurement component is still P-polarized at this point, the beam-splitting plane 70 again allows it to pass straight through toward the measurement face 16. The P-polarized measurement component then exits the beam-splitting layer 36 through the measurement face 16, passes through the second quarter-wave retarder 68 and proceeds to the target 24. The target 24 again reflects the measurement component back toward the measurement face 16 and through the second quarter-wave retarder 68.

As mentioned earlier in connection with FIG. 1, the two beams that emerge from the monolith 12 are in reality two parts of the same beam. FIG. 7 now makes it clear why this is so. In fact, the beam that emerges from the monolith 12 in FIG. 1 is only the measurement component of one of the intermediate beams 50 derived from the original input beam 48. The reference component of this intermediate beam cannot be seen in FIG. 1 because, as shown in FIG. 7, the reference component exits the monolith 12 only to reach the reference mirror 66, which cannot be seen in FIG. 1.

On its fourth and final pass through, the second quarter-wave retarder 68 transforms the S-polarized measurement component into a P-polarized measurement component. As a result, when the measurement component again reaches the beam-splitting plane 70, it is reflected toward the I/O face 20 of the beam-splitting layer 36, from which it exits the monolith 12.

It is helpful to keep in mind that the measurement component and the reference component, both in their P and S-polarized states, are traversing the same physical path through the beam-splitting layer 36. The beam that ultimately exits the I/O face 20 is thus made up of an S-polarized reference component and a P-polarized measurement component.

By the time they reach the I/O face 20, both the reference component and the measurement component have traversed a path having an internal portion, in which they were both inside the monolith 12, and an external portion, in which they were both outside the monolith 12. The path lengths for the internal portions are the same for both the measurement component and the reference component. The path lengths for the external portion are, however, different. This difference in path length provides a basis for an interferometric measurement of the distance to a point on the target 24.

Figure 8:
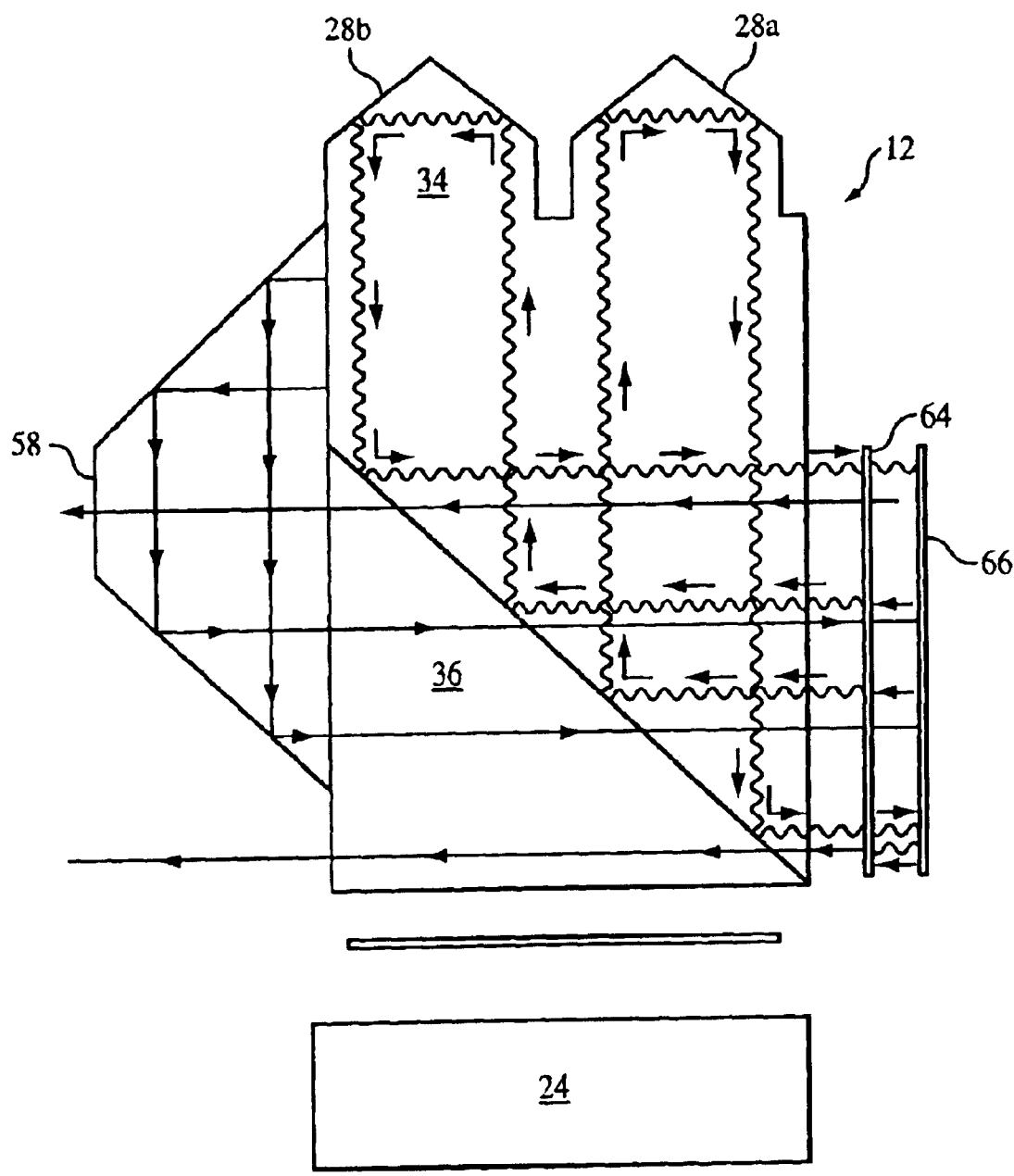
FIG. 8 shows the path followed by the reference component of the intermediate beam in a plane having two retro-reflectors.
Figure 9:
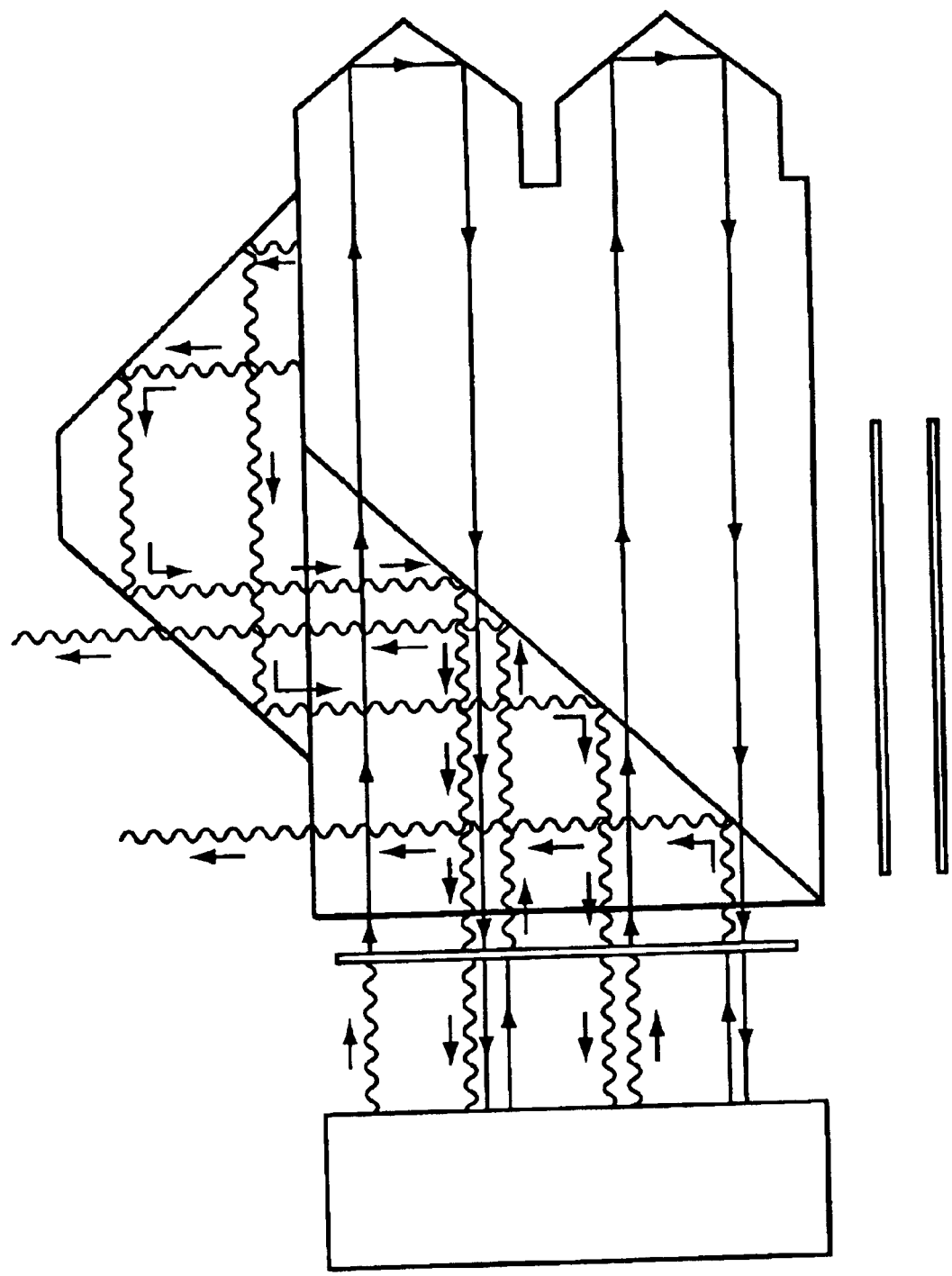
FIG. 9 shows the path followed by the measurement component of the intermediate beam in a plane having two retro-reflectors.

The principles of operation of the beam-splitting layer 36, as illustrated in connection with FIGS. 6 and 7, are readily extended to the case in which there are two or more retro-reflectors. FIGS. 8 and 9 show the paths traversed by two reference components (FIG. 8) and two measurement components (FIG. 9) in a cross-section of the interferometer 10 that lies in a plane intersecting two retro-reflectors 28a–b. One reference component in FIG. 8 and a measurement component in the corresponding location in FIG. 9 are associated with a first intermediate beam, which was derived from the first feed beam 56a shown in FIG. 4. The other reference component in FIG. 8 and the remaining measurement component in FIG. 9 are associated with the second intermediate beam, which was derived from the second feed beam 56b shown in FIG. 4. The paths taken by each reference component and each measurement component are similar to those already described in connection with FIGS. 6 and 7, and need not be discussed in detail.

FIGS. 8 and 9 also illustrate how the two feed beams shown in FIG. 4 illuminate different retro-reflectors in the same row. The reference and measurement components of the first intermediate beam illuminate the first retro-reflector. Similarly, the reference component and measurement components of the second intermediate beam illuminate the second retro-reflector. Additional retro-reflectors can be fed by providing additional feed beams for generating additional intermediate beams. This can be achieved by providing additional beam splitters in the feed structure 46 shown in FIG. 4.

Having described all the components of the interferometer 10, it is now possible to summarize the operation of the multi-axis interferometer 10 as follows. First, an input beam 48 enters the monolith 12 at the feed structure 46. This input beam 48 includes a reference component and a measurement component that are distinguishable by their respective polarizations. The feed structure 46 divides the input beam 48 into two feed beams 56a–b.

The first feed beam 56a climbs the multiplexing layer 34 of the monolith 12 in a zigzag path having as many switch-backs as there are rows of retro-reflectors. At the end of each switchback, a component of the first feed beam 56a exits the multiplexing layer 34 through an output coupler 44. This portion becomes an intermediate beam that can be used to illuminate a retro-reflector in the row of retro-reflectors that is coplanar with that output coupler 44. In this way, the first feed beam 56a generates as many intermediate beams as there are switchbacks on the zigzag path.

Meanwhile, the second feed beam 56b also climbs the multiplexing layer 34 along an identical zigzag path that is displaced from the zigzag path traversed by the first feed beam 56a. At the end of each switchback, a portion of the second feed beam 56b also exits the multiplexing layer 34 through an output coupler 44. This results in the formation of another intermediate beam that can be used to illuminate another retro-reflector in the row of retro-reflectors that is coplanar with that output coupler 44. In this way, the second feed beam 56b, like the first feed beam 56a, generates as many intermediate beams as there are switchbacks on the zigzag path.

In addition to allowing a portion of each feed beam to escape the multiplexing layer 34, each output coupler 44 also corrects the direction of the intermediate beam that emerges. This is achieved by providing a refractive element that refracts the intermediate beam into a direction normal to the output coupler 44.

Once the intermediate beams exit the multiplexing layer 34, they pass into the corner reflector 58. The corner reflector 58 redirects the intermediate beams back into the monolith 12, and in particular, into the beam-splitting layer 36 of the monolith 12. The beam-splitting layer 36 sends the measurement component of each intermediate beam toward the target 24 and the reference component of each intermediate beam toward the reference plane. It can do so because the reference component and the measurement component of each intermediate beam enter the beam-splitting layer 36 with different polarizations. As a result, the measurement and reference components can be selectively redirected by optical surfaces that transmit selected polarizations and reflect all other polarizations.

By the time they exit the beam splitting layer 36, the reference component and the measurement component will have traversed different distances. This difference can be used as a basis for an interferometric measurement.

As a result of imperfections in the manufacturing process, the measurement component that emerges from the measurement face 16 may not propagate in a direction that is orthogonal to the measurement face 16. In addition, the phase front of the measurement component may not be planar. Similar errors can also exist in the combination of the reference component and the measurement component that emerges from the I/O face 20. To achieve the most accurate measurements possible, it is desirable to correct these errors.

Figure 10:
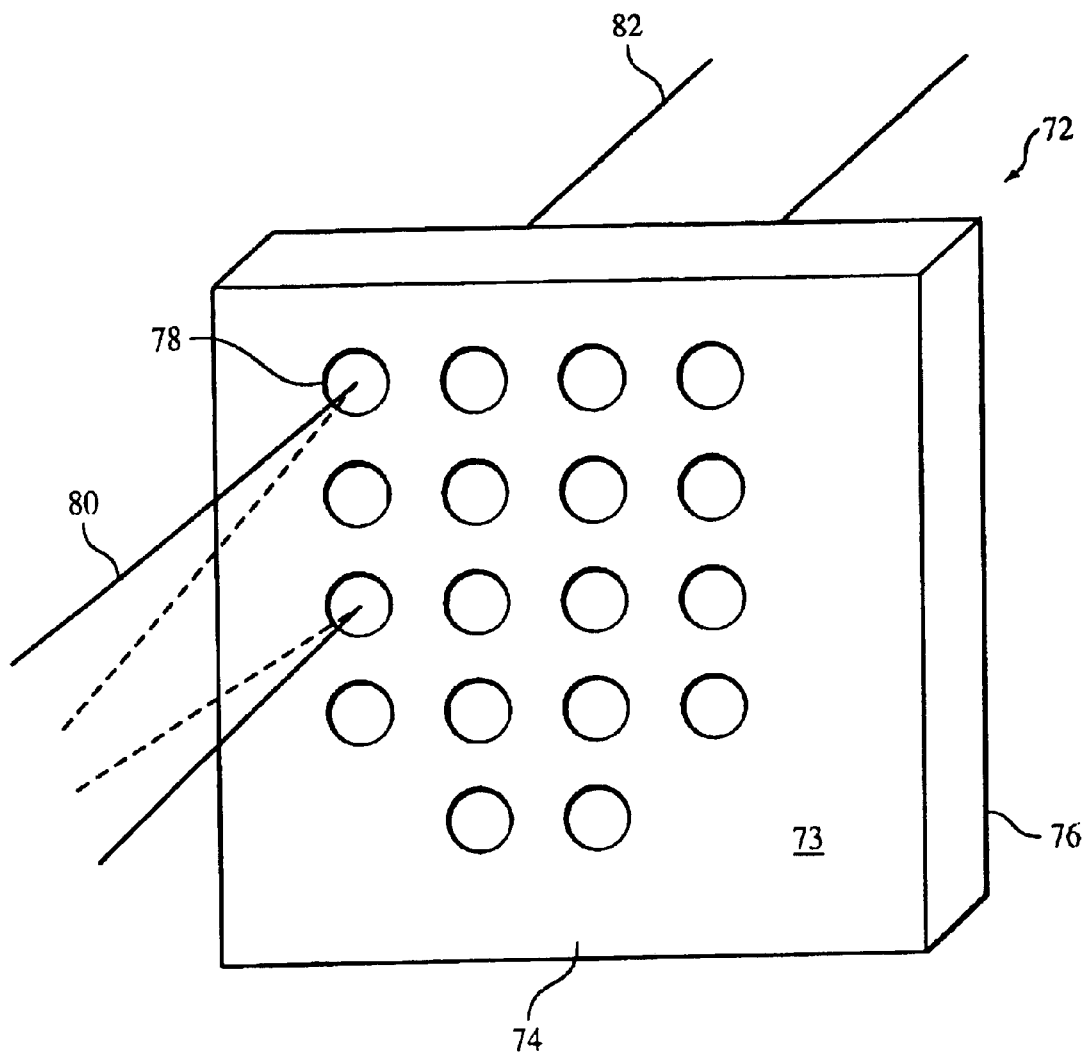
FIG. 10 shows a monolithic corrector plate for correcting the outputs of the multi-axis interferometer of FIG. 1.

A corrector plate 72 according to the invention, as shown in FIG. 10, is formed from a substrate 73 having an input face 74 and an output face 76 opposite the input face 74. Both the input face 74 and the output face 76 of the substrate 73 are polished flat. The substrate 73 is typically made of an optically transmissive material such as glass or a glass-ceramic composite material. An optical coating can be placed on either or both its input face 74 and output face 76.

Formed integrally with the substrate 73 is an array of aperture portions 78. The particular configuration of aperture portions 78 shown in FIG. 1 is such that when the corrector plate 72 is placed in front of the measurement face 16 of the multi-axis interferometer 10, each aperture portion intercepts one of the measurement components that emerge from the measurement face 16 A similar corrector plate with a different spatial distribution of aperture portions can be used to intercept beams emerging from the I/O face 20. With the exception of the distribution of aperture portions, a corrector plate for intercepting beams emerging from the I/O face 20 is identical to one that intercepts beams emerging from the measurement face 16. Accordingly, only the corrector plate 72 for intercepting measurement beams is described in detail below.

The aperture portions 78 shown in FIG. 1 are round. However, the aperture portions 78 can also be rectangular, or irregular in shape. In addition, the aperture portions 78 can be made to continuously blend into each other, thereby obliterating any sharp boundaries between neighboring aperture portions 78. Such a corrector plate 72 can have a continuously varying curved input face 74 or output face 76 rather than discrete aperture portions 78.

To manufacture a corrector plate 72, the error associated with a particular measurement component is first measured or otherwise characterized. Once these errors are known, it is possible to define the geometry of an aperture portion 78 to correct those errors. This process is then repeated for each of the measurement components. In general, each measurement component has its own unique errors. Hence, the geometries of the aperture portions 78 differ from each other to the extent that the errors in the measurement components differ from each other.

An aperture portion 78 can be a prism angled to refract a measurement beam 80 incident on the input face 74. This results in the emergence, from the output face 76, of a beam 82 having a direction of propagation that differs from that of the measurement beam incident on the input face 74. The orientation and geometry of the prism is selected such that the beam 82 that emerges from the output face 76 propagates in a direction orthogonal to the output face 76.

An aperture portion 78 can also be a lens whose curvature is defined to correct the phase fronts of a measurement beam incident on the input face 76. This results in the emergence, from the output face 76, of a beam having planar phase fronts.

Once the geometries of the aperture portions 78 are defined, various polishing techniques are available for forming the appropriate geometries at appropriate locations on the substrate 73. Where the aperture portions 78 are small and close together, magneto-rheologic polishing is particularly suitable for forming the aperture portions 78. This technique can be used to form a continuously varying surface, thereby obliterating any sharp boundaries between neighboring aperture portions 78.

FIG. 1 shows a first corrector plate 84 of the type described above mounted on the interferometer 10. The first corrector plate 84 is placed on the measurement face so that each aperture portion thereof intercepts one of the measurement components that emerge from the measurement face of the interferometer 10. A second corrector plate 86 of similar construction is mounted such that its aperture portions intercept beams that emerge from the I/O face of the interferometer 10.

Having described the invention, and a preferred embodiment thereof, what we claim as new and secured by letters patent is:

1. An apparatus comprising:
   an interferometer including a component comprising a common material through which multiple interferometer beams pass, the component including a face formed by an exposed portion of the material,
   the face having multiple regions each formed by local surface variations in the common material, each region positioned to receive one of the interferometer beams and modify its propagation properties,
   at least two of the regions configured to modify the propagation properties of their respective interferometer beams differently from one another.

2. The apparatus of claim 1, wherein the component is a corrector plate secured to another component of the interferometer.

3. The apparatus of claim 1, wherein the interferometer comprises a polarizing beam splitter optic.

4. The apparatus of claim 3, wherein the component is different from the polarizing beam splitter optic.

5. The apparatus of claim 1, wherein the interferometer further comprises a polarizing beam splitter and the component is a corrector plate configured to be secured to the polarizing beam splitter.

6. The apparatus of claim 1, wherein the interferometer is a multi-axis interferometer configured to direct multiple measurement beams to contact different locations of a test object and combine each measurement beam with a corresponding reference beam after it contacts the test object.

7. The apparatus of claim 1, wherein the regions are formed on the face of the component by Magneto Rheological Finishing (MRF).

8. The apparatus of claim 1, wherein each region modifies the propagation properties of its respective interferometer beam differently from that of every other region.

9. The apparatus of claim 1, wherein one or more of the regions modify the propagation direction of their respective interferometer beams.

10. The apparatus of claim 1, wherein one or more of the regions have surface profiles shaped like a prism.

11. The apparatus of claim 1, wherein each region modifies the phase front of its respective interferometer beam.

12. The apparatus of claim 1, wherein one or more of the regions have surface profiles shaped like a lens.

13. The apparatus of claim 1, wherein two or more of the regions are discretely spaced from one another.

14. The apparatus of claim 1, wherein two or more of the regions merge continuously with one another.

* * * * *

UNITED STATES PATENT AND TRADEMARK OFFICE
CERTIFICATE OF CORRECTION

PATENT NO. : 6,717,678 B2
DATED : April 6, 2004
INVENTOR(S) : Robert M. Lex and Andrew Eric Carlson It is certified that error appears in the above-identified patent and that said Letters Patent is hereby corrected as shown below:

<u>Title page,</u>
Item [75], Inventors, replace "Middletown, CT (US)" with -- Higganum, CT (US) --; and replace "Yorktown Heights, NJ (US)" with -- Yorktown Heights, NY (US) --

Signed and Sealed this

Ninth Day of November, 2004

JON W. DUDAS
*Director of the United States Patent and Trademark Office*